United States Patent
Järvinen et al.

(10) Patent No.: US 9,386,066 B2
(45) Date of Patent: Jul. 5, 2016

(54) MIXING OF ENCODED VIDEO STREAMS

(75) Inventors: Jussi Järvinen, Espoo (FI); Dietmar Fiedler, Kirkkonummi (FI); Arto Mahkonen, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/383,832

(22) PCT Filed: Mar. 13, 2012

(86) PCT No.: PCT/SE2012/050278
§ 371 (c)(1),
(2), (4) Date: Sep. 8, 2014

(87) PCT Pub. No.: WO2013/137784
PCT Pub. Date: Sep. 19, 2013

(65) Prior Publication Data
US 2015/0130889 A1     May 14, 2015

(51) Int. Cl.
*H04N 7/14*    (2006.01)
*H04L 29/06*   (2006.01)
(Continued)

(52) U.S. Cl.
CPC .......... *H04L 65/607* (2013.01); *H04L 65/4069* (2013.01); *H04L 65/602* (2013.01);
(Continued)

(58) Field of Classification Search
None
See application file for complete search history.

(56) References Cited

U.S. PATENT DOCUMENTS

2005/0231588 A1   10/2005   Yang et al.
2007/0189717 A1*  8/2007    Yun ................ H04N 21/440263
                                                              386/230
(Continued)

FOREIGN PATENT DOCUMENTS

GB    2433852 A    7/2007
JP    2004023706 A 1/2004
(Continued)

OTHER PUBLICATIONS

Unknown, Author, "Advanced Video Coding for Generic Audiovisual Services", ITU-T, H.264, Series H: Audiovisual and Multimedia Systems, Infrastructure of Audiovisual Services—Coding of Moving Video, May 2003, pp. 1-271.
(Continued)

*Primary Examiner* — Maria El-Zoobi
(74) *Attorney, Agent, or Firm* — Murphy, Bilak & Homiller, PLLC

(57) ABSTRACT

Describe is a video stream mixer (60) for generating a mixed encoded video stream from an encoded primary video stream associated with a primary window, and at least one encoded secondary video stream, each associated with a corresponding secondary window that is smaller than the primary window. The mixer includes the following elements: A video stream splitter (20) configured to split the encoded primary video stream into an encoded unmixed sub-stream associated with a sub-window in the primary window and not involved in mixing, and an encoded complementary sub-stream associated with a sub-window complementary to the other sub-window in the primary window and involved in mixing; A video stream decoder (22) configured to decode the complementary sub-stream and each secondary video stream; A video signal mixer (24) configured to mix the decoded complementary sub-stream with each decoded secondary video stream to form a mixed video signal; A video encoder (26) configured to encode the mixed video signal into an encoded mixed sub-stream; A video stream combiner (28) configured to combine the encoded unmixed sub-stream with the encoded mixed sub-stream.

11 Claims, 12 Drawing Sheets

(51) Int. Cl.
*H04N 5/265* (2006.01)
*H04N 7/15* (2006.01)
*H04N 19/46* (2014.01)
*H04N 19/17* (2014.01)
*H04N 19/40* (2014.01)
*H04N 19/55* (2014.01)

(52) U.S. Cl.
CPC ............... *H04N 5/265* (2013.01); *H04N 7/15* (2013.01); *H04N 19/17* (2014.11); *H04N 19/40* (2014.11); *H04N 19/46* (2014.11); *H04N 19/55* (2014.11)

(56) References Cited

U.S. PATENT DOCUMENTS

| | | |
|---|---|---|
| 2008/0117285 A1 | 5/2008 | Tanaka |
| 2010/0303145 A1 | 12/2010 | Nambiath et al. |
| 2012/0027085 A1* | 2/2012 | Amon ..................... H04N 7/15 375/240.12 |
| 2012/0050452 A1 | 3/2012 | Lee et al. |
| 2012/0050454 A1 | 3/2012 | Eisenberg et al. |

FOREIGN PATENT DOCUMENTS

| | | |
|---|---|---|
| JP | 2005341325 A | 12/2005 |
| JP | 2009505589 A | 2/2009 |
| WO | 2008043858 A1 | 4/2008 |

OTHER PUBLICATIONS

Wenger, Stephan et al., "Codec Control Messages in the Audio-Visual Profile with Feedback (AVPF)", IETF Network Working Group, Internet-Draft, May 24, 2006, pp. 1-48.

Xu, Di et al., "Logo Insertion Transcoding for H.264/AVC Compressed Video", ICIP, 2009, 3693-3696.

* cited by examiner

MIXING OF ENCODED VIDEO STREAMS

TECHNICAL FIELD

The proposed technology relates to mixing of encoded video steams.

BACKGROUND

In existing solutions for mixing of encoded video steams all the streams are completely decoded. Thereafter the decoded video frames are mixed, and finally the mixed frames are encoded into a mixed encoded video stream. The same procedure is used even if the area to be mixed is small compared to the whole frame.

SUMMARY

An object of the proposed technology is a more efficient mixing of encoded video streams.

This object is achieved in accordance with the attached claims.

A first aspect of the proposed technology involves a method of generating a mixed encoded video stream from an encoded primary video stream associated with a primary window, and at least one encoded secondary video stream, each associated with a corresponding secondary window that is smaller than the primary window. The method including the following steps:

The encoded primary video stream is split into an encoded unmixed sub-stream associated with a sub-window in the primary window and not involved in mixing, and an encoded complementary sub-stream associated with a sub-window complementary to the other sub-window in the primary window and involved in mixing.

The complementary sub-stream and each secondary video stream are decoded.

The decoded complementary sub-stream is mixed with each decoded secondary video stream to form a mixed video signal.

The mixed video signal is encoded into an encoded mixed sub-stream.

The encoded unmixed sub-stream is combined with the encoded mixed sub-stream.

A second aspect of the proposed technology involves a video stream mixer for generating a mixed encoded video stream from an encoded primary video stream associated with a primary window, and at least one encoded secondary video stream, each associated with a corresponding secondary window that is smaller than the primary window. The mixer includes the following elements:

A video stream splitter configured to split the encoded primary video stream into an encoded unmixed sub-stream associated with a sub-window in the primary window and not involved in mixing, and an encoded complementary sub-stream associated with a sub-window complementary to the other sub-window in the primary window and involved in mixing.

A video stream decoder configured to decode the complementary sub-stream and each secondary video stream.

A video signal mixer configured to mix the decoded complementary sub-stream with each decoded secondary video stream to form a mixed video signal.

A video encoder configured to encode the mixed video signal into an encoded mixed sub-stream.

A video stream combiner configured to combine the encoded unmixed sub-stream with the encoded mixed sub-stream.

A third aspect of the proposed technology involves a media resource function processor including a video stream mixer in accordance with the second aspect.

A fourth aspect of the proposed technology involves a media resource function including a media resource function processor in accordance with claim the third aspect.

A fifth aspect of the proposed technology involves a video conferencing system including a media resource function in accordance with the fourth aspect.

A sixth aspect of the proposed technology involves a video conferencing system including a video stream mixer in accordance with the second aspect.

An advantage of the proposed technology is that it requires less processing power than the prior art solutions. This is especially the case in applications such as video conferencing, in which the same encoded primary video stream is mixed with several encoded secondary video streams in different combinations.

BRIEF DESCRIPTION OF THE DRAWINGS

The technology, together with further objects and advantages thereof, may best be understood by making reference to the following description taken together with the accompanying drawings, in which.

DETAILED DESCRIPTION

The following description will describe mixing of encoded video streams in the context of video conferencing. However, it should be appreciated that the same principles may be used in other applications that require mixing of encoded video streams. One example is advertising, where a common video is provided with different small personalized advertisements (different for different customers).

Furthermore, the following description will be based on the ITU-T standard H.264. However, it should be appreciated that the same principles may also be used in, but is not limited to, other standards, such as H.263, MPEG4, VP8.

The proposed technology will be described with reference to the media resource function (MRF) of an IMS (IP Multimedia Subsystem) network. However, it should be understood that the same principles are applicable to other video mixers for video conferencing.

Figure 1:
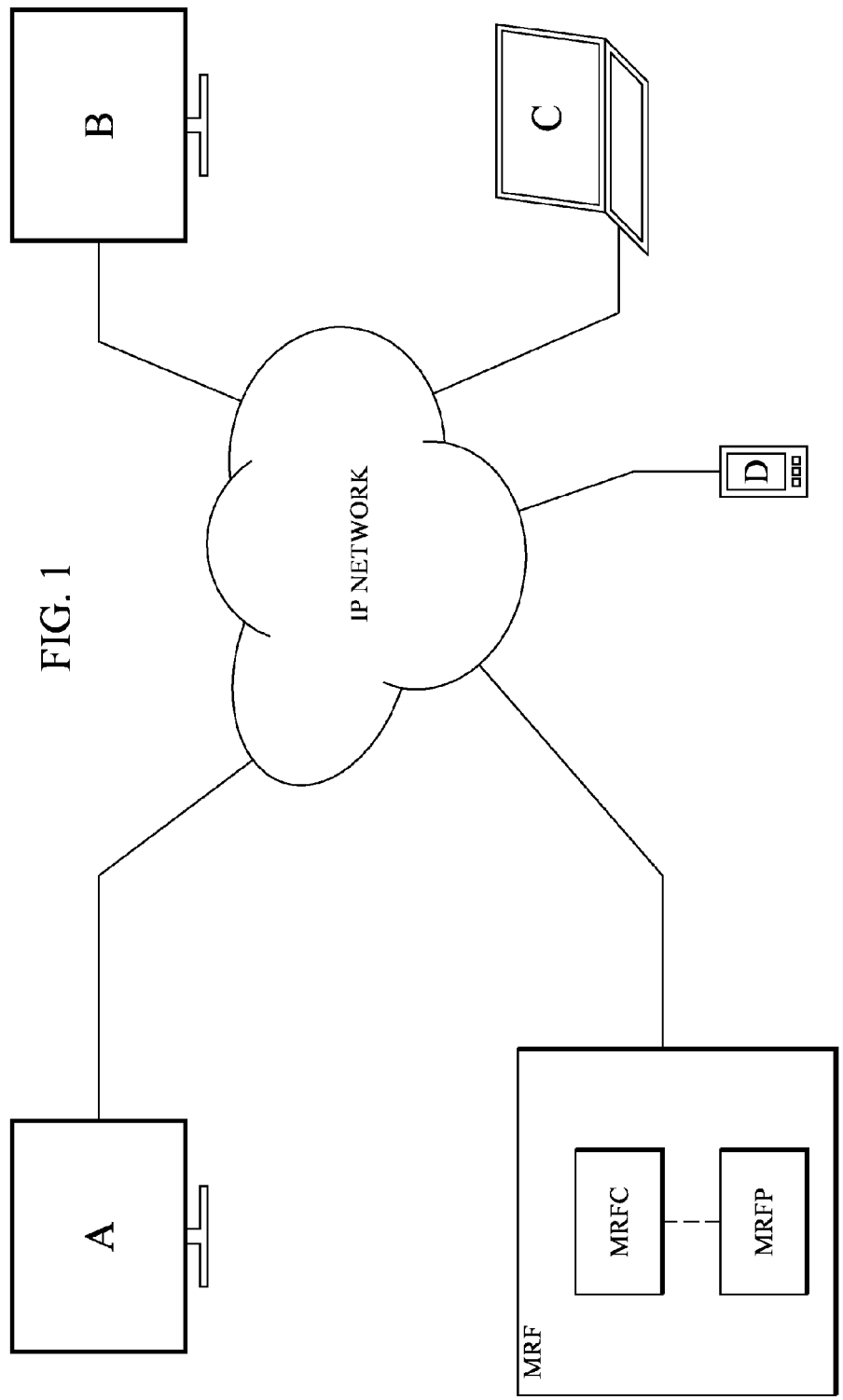
FIG. 1 is a diagram illustrating a video conferencing system based on an IP (Internet Protocol) network.

FIG. 1 is a diagram illustrating a video conferencing system based on an IP network. In this example two participants A and B using video conferencing equipment are connected to a participant C using a computer and a participant D using a mobile phone over an IP network. The video conference is managed by a media resource function MRF including a media resource function processor MRFP controlled by a media resource function controller MRFC.

Figure 2:
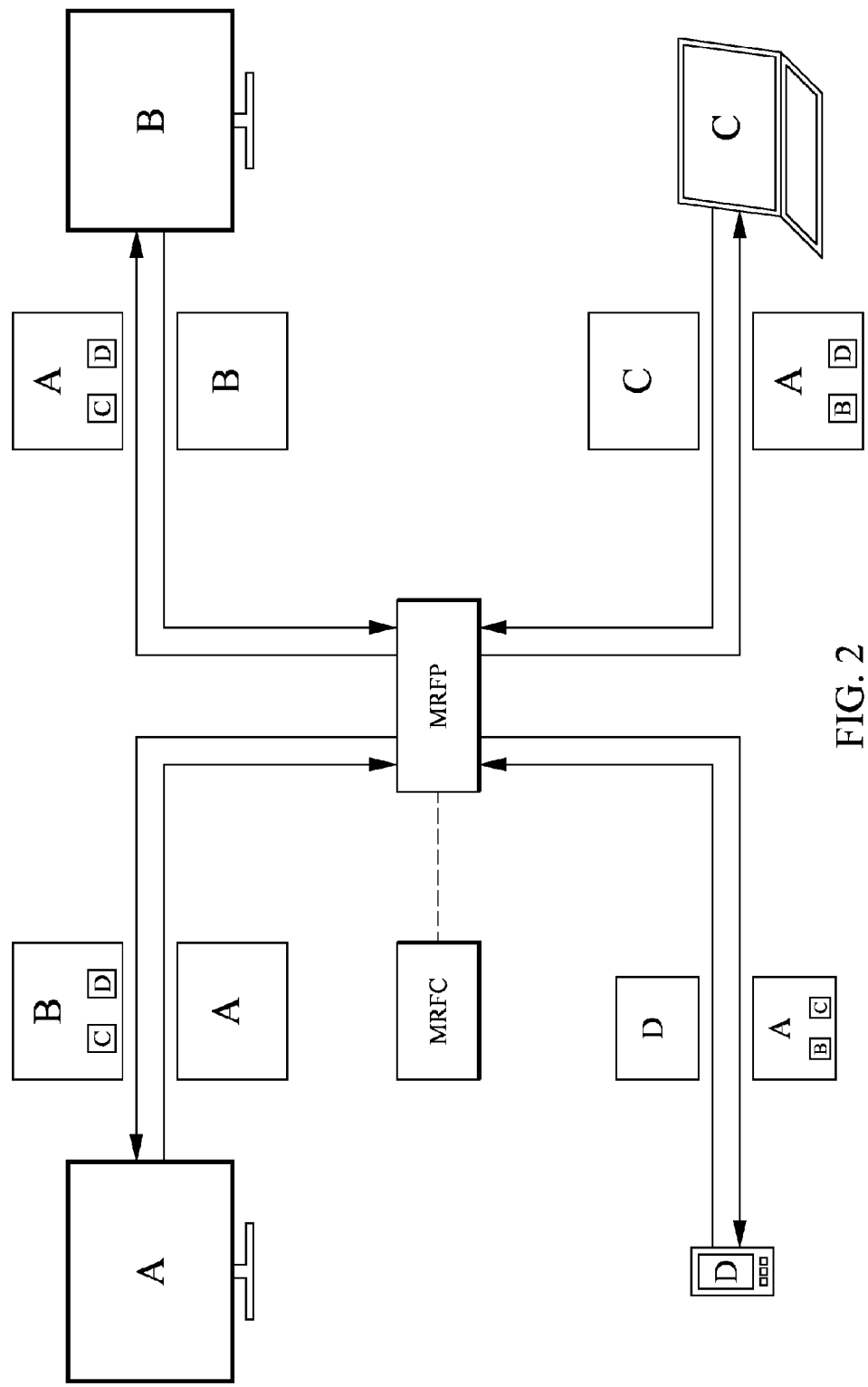
FIG. 2 is a block diagram illustrating interconnections in a video conferencing system.

FIG. 2 is a block diagram illustrating interconnections in a video conferencing system in more detail. In this example participant A is assumed to be the currently active speaker. This means that the corresponding encoded video stream A will be mixed with encoded video streams B, C, D from the other participants in various combinations. This mixing is performed by the media resource function processor MRFP in such a way that the other participants receive videos dominated by the active speaker A with small windows showing other participants. For example, participant D will receive a video dominated by participant A with small windows showing participants B and C. None of the participants see themselves in the received video. Participant A, the currently active speaker, will receive a video dominated by one of the other participants, typically the second most active speaker, which in the example happens to be participant B. It is also possible to use a floor control protocol to moderate the selection of the person to be seen by the other participants.

Figure 3:
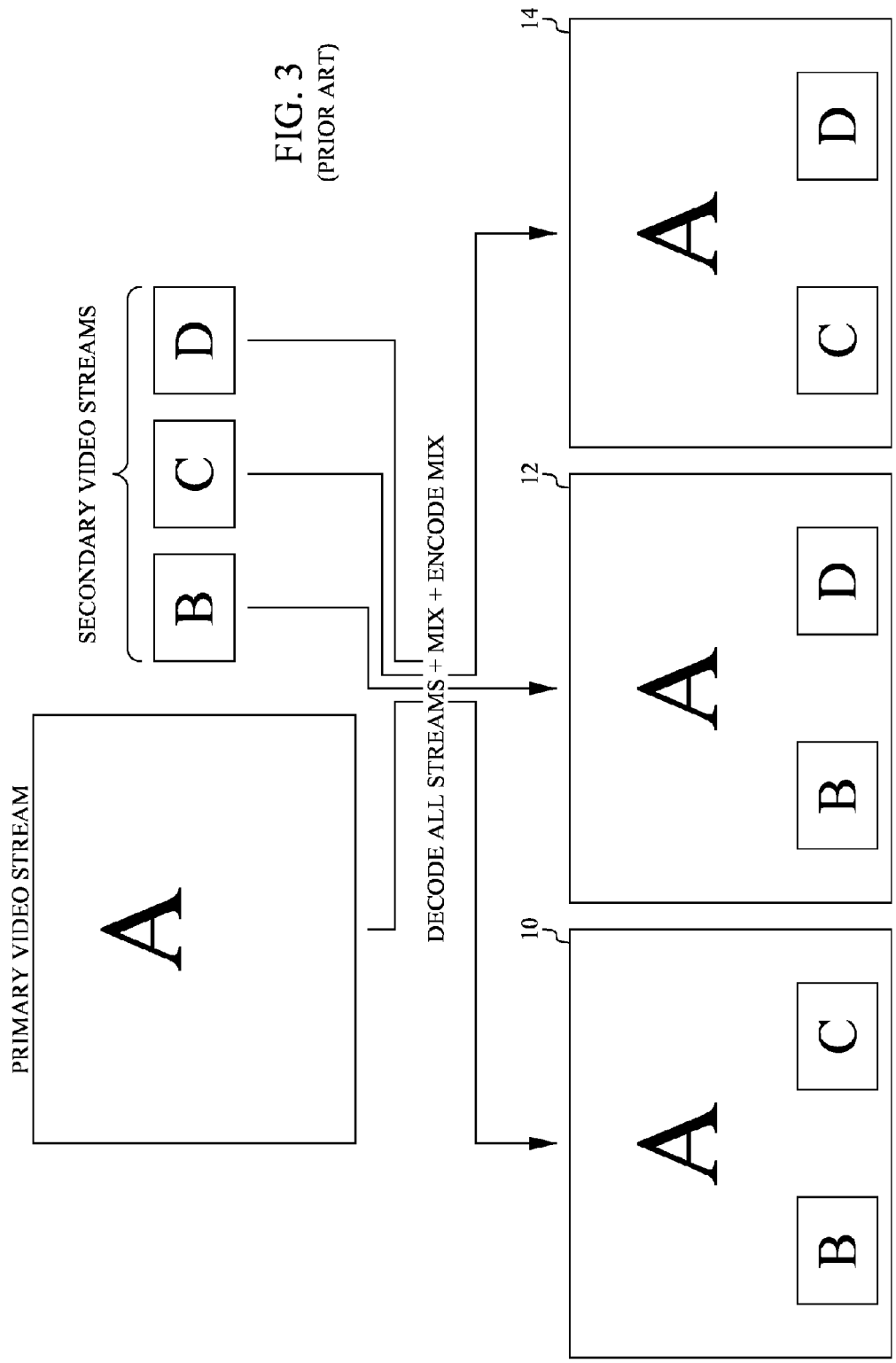
FIG. 3 illustrates mixing of encoded video streams in prior art video conferencing systems.

FIG. 3 illustrates mixing of encoded video streams in prior art video conferencing systems. An encoded primary video stream A acts as a canvas on which the encoded secondary video streams will be placed. The prior art method starts by decoding all video streams A-D. The decoded videos are then mixed into the combinations A+B+C, A+B+D, A+C+D. Referring back to the example in FIG. 2, the combination B+C+D will also be generated, but it is not illustrated in FIG. 3. After mixing, the mixed videos are encoded into the encoded mixed video streams 10, 12, 14.

Figure 4:
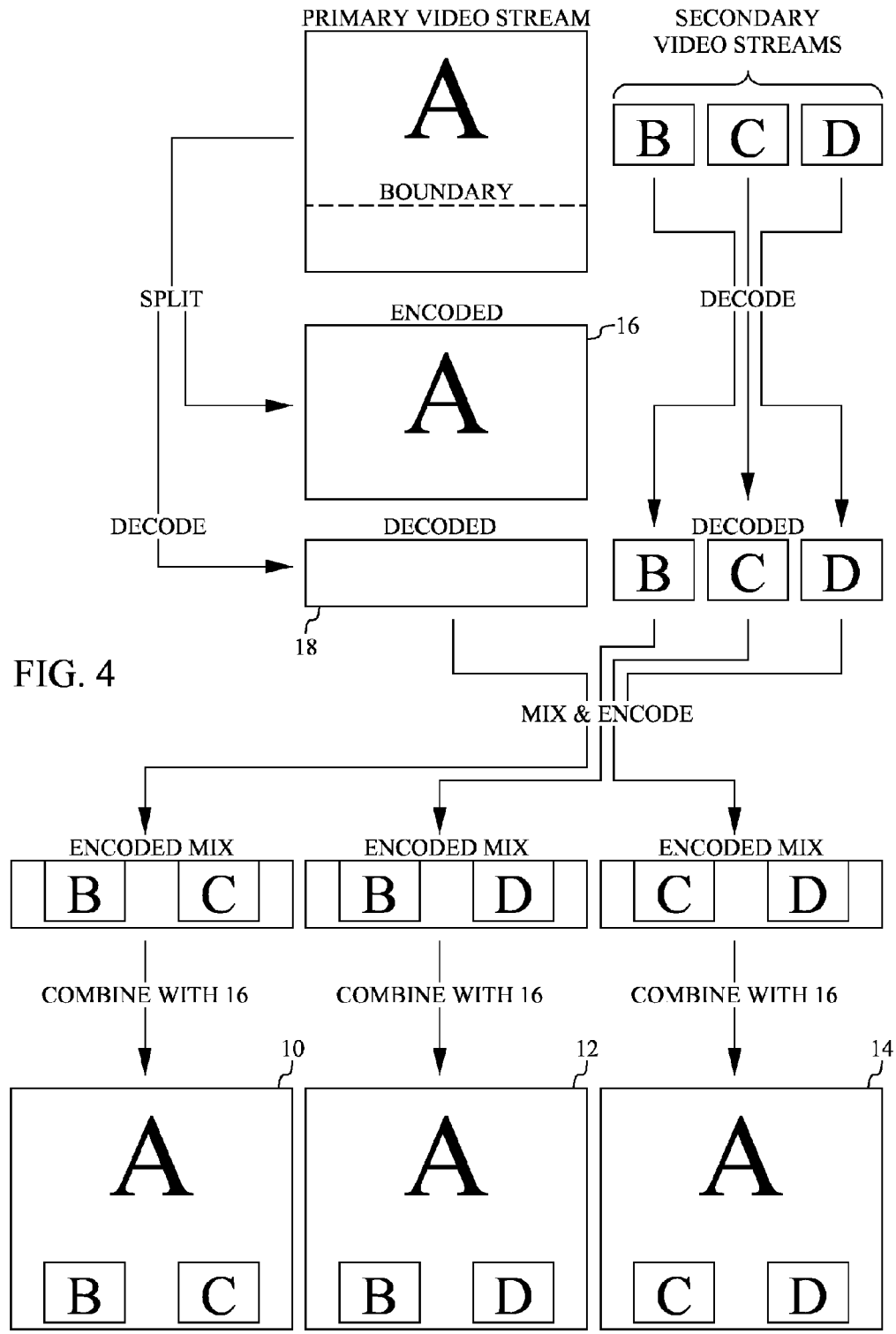
FIG. 4 illustrates an example of mixing of encoded video streams in a video conferencing system based on the proposed technology.

FIG. 4 illustrates an example of mixing of encoded video streams in a video conferencing system based on the proposed technology. In the prior art method illustrated in FIG. 3 it is noted that most of the video stream A is unchanged after mixing. However, the entire stream still has to be decoded and re-encoded for each mix. In FIG. 4 the encoded primary video stream is split into an encoded part 16 that is not involved in mixing, and a part 18 that is involved in mixing. The latter part 18 is decoded and mixed with the decoded secondary video streams B, C, D. The different mixes are encoded and combined with the encoded part 16.

Figure 5:
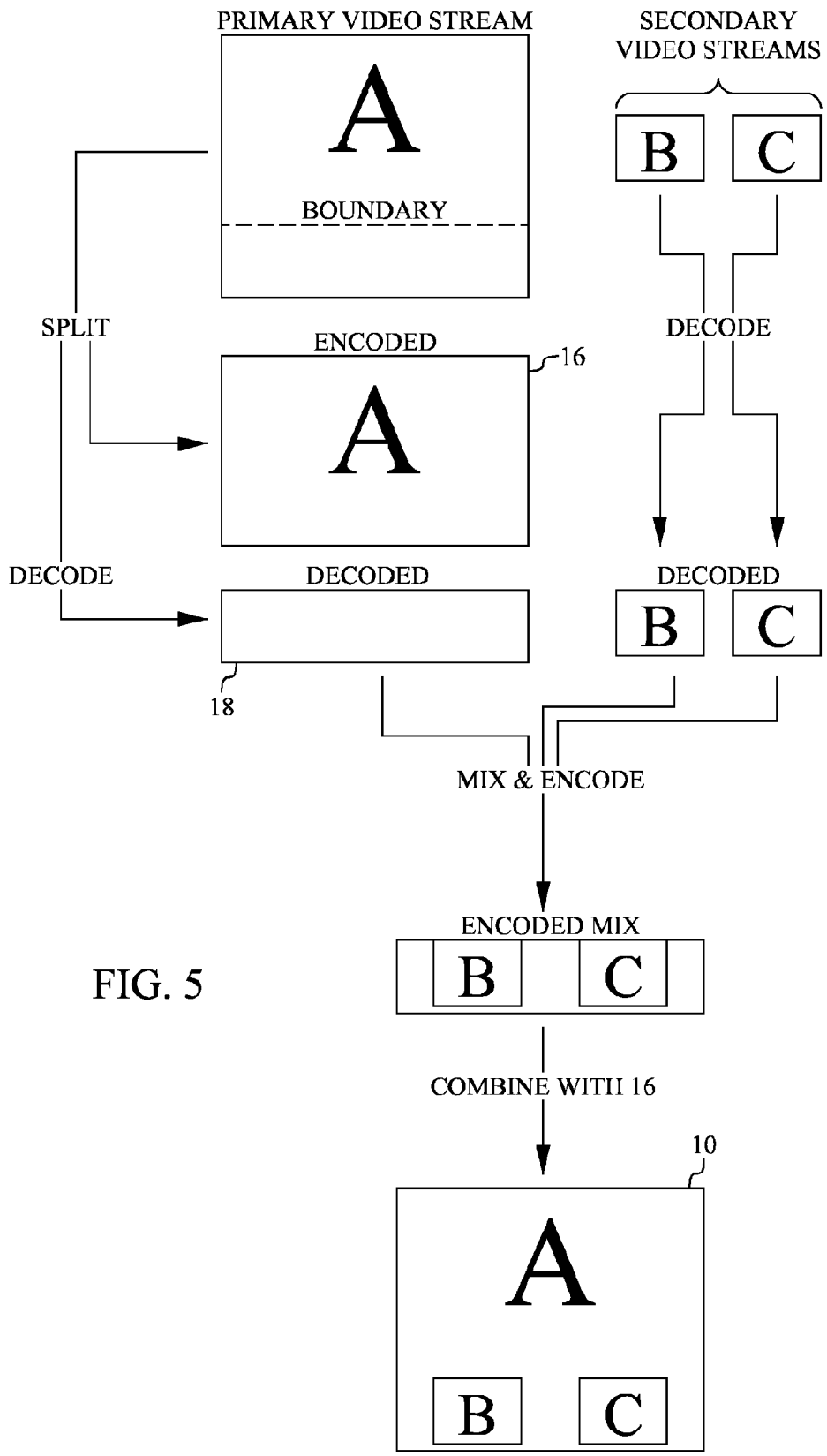
FIG. 5 illustrates an example of mixing of encoded video streams in accordance with the proposed technology.

FIG. 5 illustrates an example of mixing of encoded video streams (not necessarily from a video conferencing system) in accordance with the proposed technology. An encoded primary video stream is split into an encoded part 16 that is not involved in mixing, and a part 18 that is involved in mixing. The latter part 18 is decoded and mixed with the decoded secondary video streams B, C. The mix is encoded and combined with the encoded part 16.

Figure 6:
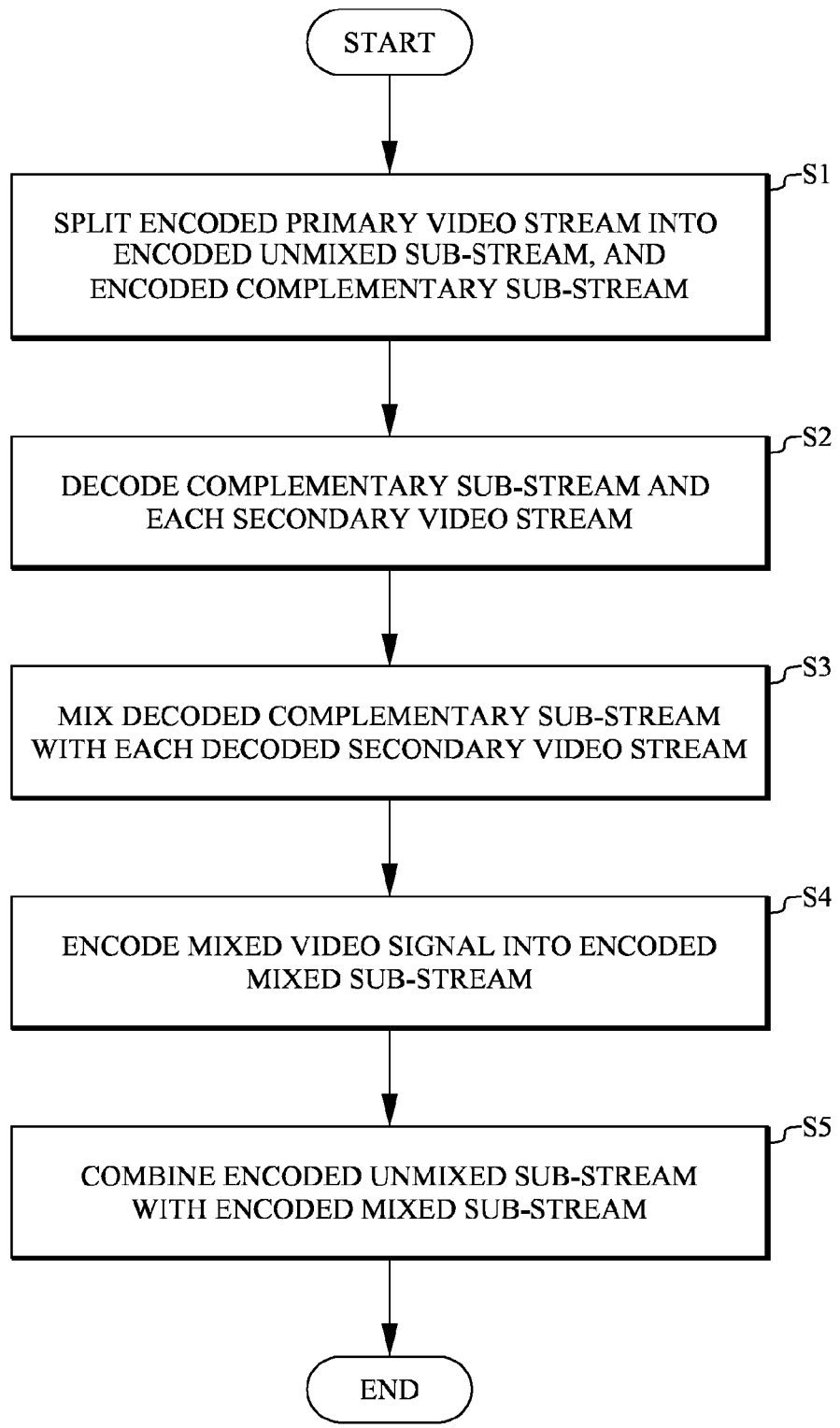
FIG. 6 is a flow chart of a method of generating a mixed encoded video stream in accordance with the proposed technology.

FIG. 6 is a flow chart of a method of generating a mixed encoded video stream in accordance with the proposed technology. The method generates a mixed encoded video stream from an encoded primary video stream associated with a primary window, and at least one encoded secondary video stream, each associated with a corresponding secondary window that is smaller than the primary window. Step S1 splits the encoded primary video stream, for example stream A in FIG. 5, into an encoded unmixed sub-stream associated with a sub-window, for example window 16 in FIG. 5, in the primary window and not involved in mixing, and an encoded complementary sub-stream associated with a sub-window, for example window 18 in FIG. 5, complementary to the other sub-window in the primary window and involved in mixing.

Step S2 decodes the complementary sub-stream and each secondary video stream, for example B, C in FIG. 5. Step S3 mixes the decoded complementary sub-stream with each decoded secondary video stream to form a mixed video signal. Step S4 encodes the mixed video signal into an encoded mixed sub-stream. Step S5 combines the encoded unmixed sub-stream with the encoded mixed sub-stream. From a decoder's point of view the combined video is the same as in the prior art.

So far the description has not explicitly referred to any video encoding standard. Example embodiments will now be described with reference to the ITU-T standard H.264.

Figure 7:
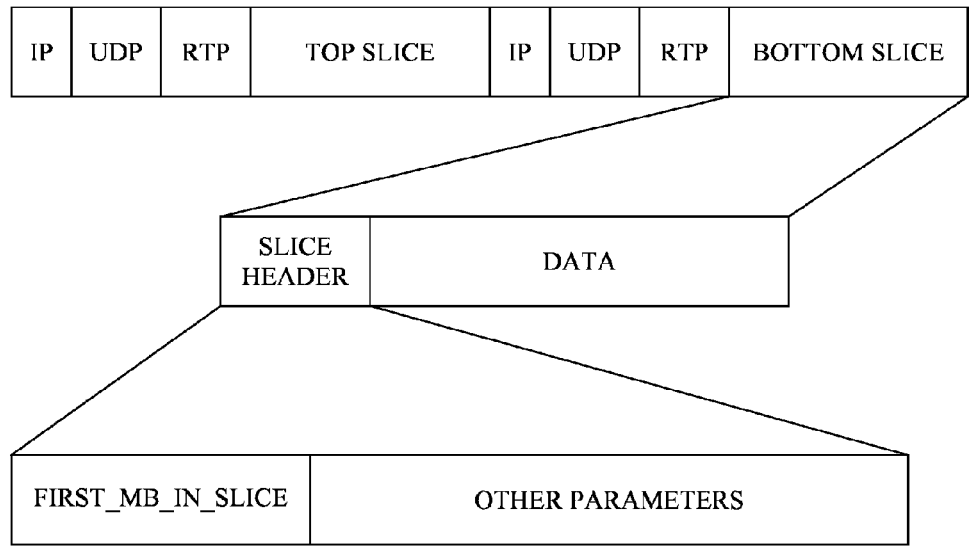
FIG. 7 illustrates the structure of an example of an encoded video stream.

FIG. 7 illustrates the structure of a video stream encoded in accordance H.264. In this example the video frames are encoded into slices, which are sent in IP packets. Each packet includes an IP, UDP (User Data gram Protocol) and RTP (Real-time Transport Protocol) header in addition to the payload that contains the actual slice information (other configurations are also possible, but this example is sufficient for explaining the concepts of the proposed technology). The slice includes a slice header and actual data. The slice header includes a set of parameters, one of which is "first_mb_in_slice". Here "mb" refers to a macro block, typically representing 16×16 pixels. Further details may be found in [1].

In an embodiment of the proposed technology macro blocks involved in mixing and macro blocks not involved in mixing are determined. Thereafter the encoded primary video stream, for example A in FIG. 5, is separated into at least one unmixed slice of macro blocks not involved in mixing and at least one complementary slice of macro blocks involved in mixing.

In an embodiment of the proposed technology macro blocks of each complementary slice are renumbered before decoding. After mixing and encoding the numbering of the renumbered macro blocks is reset.

When a primary video stream is split in the way described herein, the unmixed and complementary sub-streams should be "insulated" from each other. This means that no part in one sub-stream may refer to any part in the other sub-stream. For example, motion vector searches during encoding have to be limited so that they do not refer to macro blocks on the other side of the boundary. In other words, motion vectors that belong to macro blocks in part 18 shall not refer to a frame area that belongs to part 16 (and vice versa). One way of achieving this "insulation" of the different parts from each other is to inform the originating encoder that creates the primary video stream of the location of the boundary, for example by signaling the index of the first macro block of the bottom part 18. The originating encoder can then encode the primary video stream in such a way that macro blocks do not refer to areas across the boundary. The video stream splitter 20 can then separate the primary video stream into two independent streams. If the originating encoder does not receive this information, the stream may instead be transcoded (decoded and encoded) to include two parts that are "insulated" from each other. This only has to be done once, so this embodiment is still more efficient than the prior art if several mixes are to be produced.

Figure 8A:
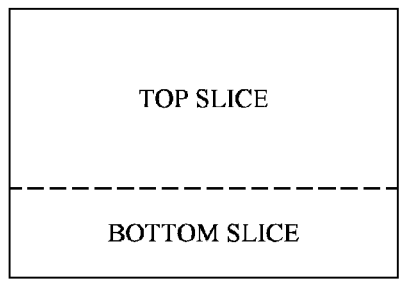
FIGS. 8A-C illustrate various video frame configurations.
Figure 8B:
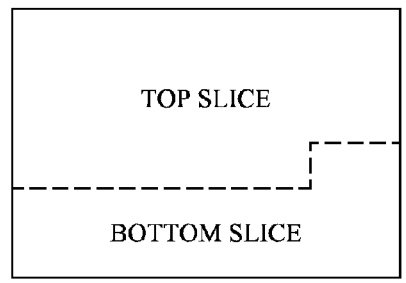
Figure 8C:
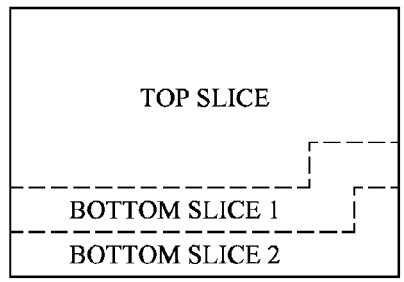

Various video frame configurations are illustrated in FIGS. 8A-C. In all cases it is assumed that top and bottom parts have been "insulated" from each other as described above, either by encoding with a boundary already at the originating encoder or by transcoding before the video stream splitter.

The example in FIG. 8A contains a top slice and a bottom slice separated by a straight boundary (dashed). In this case the bottom slice can be decoded simply by setting the parameter first_mb_in_slice of the bottom slice to "fool" the decoder into thinking that the frame only includes the bottom slice. For example, if the first macro block of the bottom slice has number 66, it is set to 1 (assuming that the decoder expects this number for the first macro block). After mixing and encoding the first macro block is reset to 66, so that the encoded mix can be added as a bottom slice to the encoded top slice (which has not been decoded). All other parameters are the same as in the original primary stream.

The example in FIG. 8B contains a top slice and a bottom slice separated by a boundary that is not straight. However, since the size of the macro blocks and of the width and height of the entire video frame are known, the border can be uniquely determined also in this case. Thus, the decoding, mixing and encoding is performed as in FIG. 8A.

Figure 9:
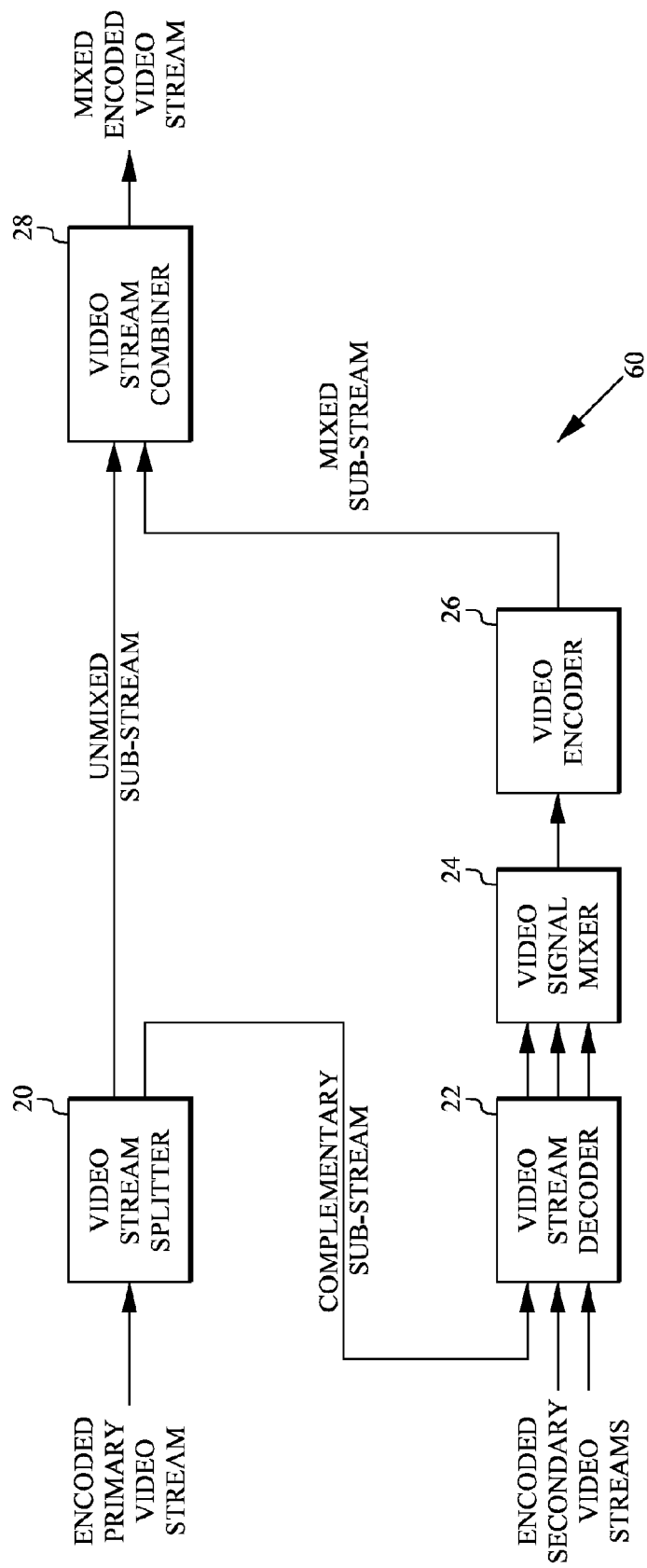
FIG. 9 is a block diagram of an embodiment of a video stream mixer in accordance with the proposed technology.

The example in FIG. 8C contains a top slice and two bottom slices. The top and bottom slices are separated by a boundary that is not straight. In this case the parameter "first_mb_in_slice" has to be set to 1 and 1+the number of macro blocks in the upper bottom slice, respectively, in the 2 bottom slices before decoding. Similarly, the numbering of both bottom slices is reset after mixing and encoding, FIG. 9 is a block diagram of an embodiment of a video stream mixer 60 in accordance with the proposed technology. A video stream splitter 20 receiving the encoded primary video steam, for example stream A in FIG. 5, is configured to split it into
- an encoded unmixed sub-stream associated with a sub-window (16) in the primary window and not involved in mixing, and
- an encoded complementary sub-stream associated with a sub-window (18) complementary to the other sub-window in the primary window and involved in mixing.

A video stream decoder 22 is configured to decode the complementary sub-stream and each secondary video stream, for example streams B, C in FIG. 5. A video signal mixer 24 is configured to mix the decoded complementary sub-stream with each decoded secondary video stream to form a mixed video signal. (It is assumed that the decoded secondary video streams have been rescaled to "small" windows before mixing.) A video encoder 26 is configured to encode the mixed video signal into an encoded mixed sub-stream. A video stream combiner 28 is configured to combine the encoded unmixed sub-stream with the encoded mixed sub-stream.

Figure 10:
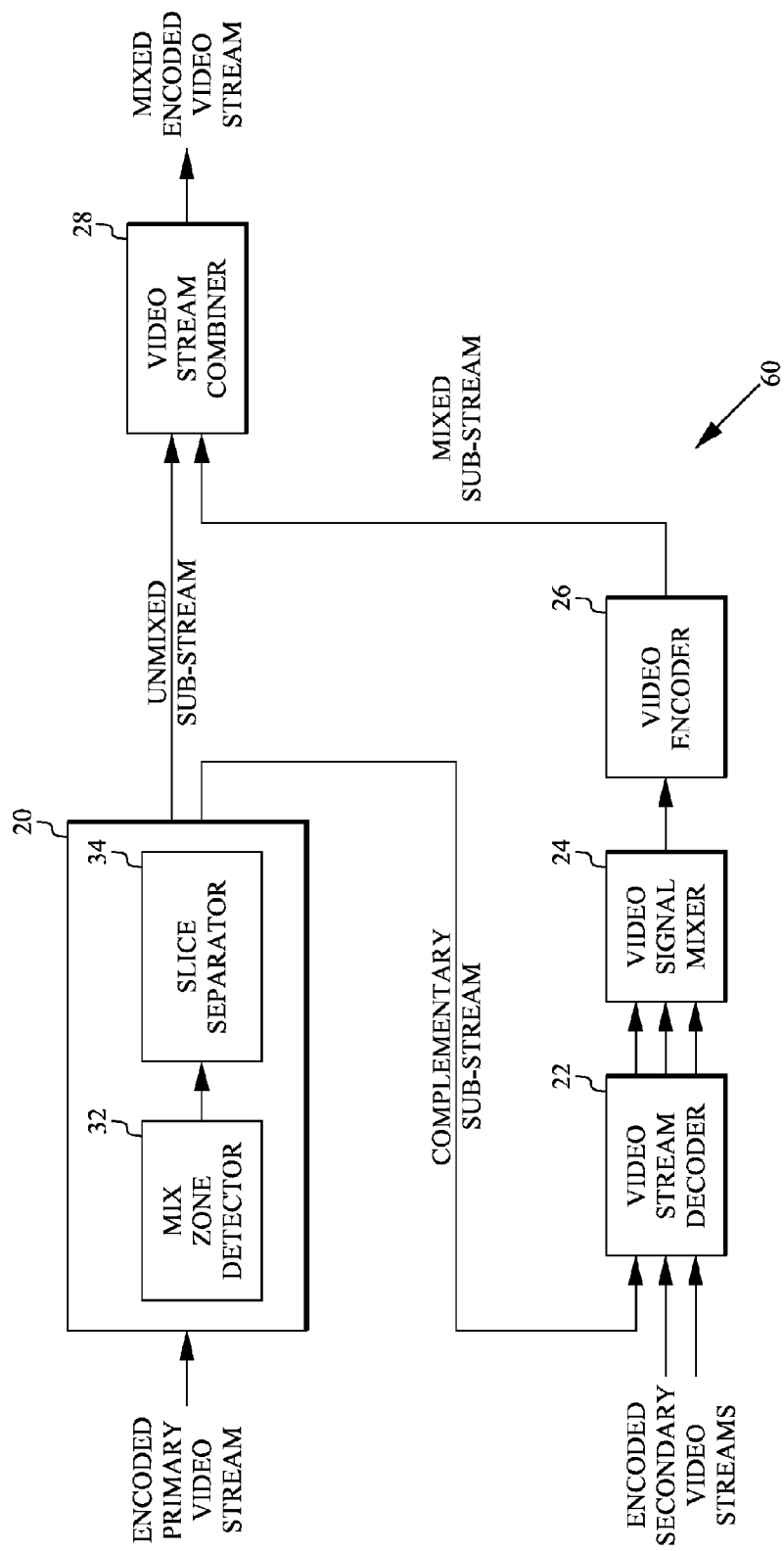
FIG. 10 is a block diagram of an embodiment of a video stream mixer in accordance with the proposed technology.

FIG. 10 is a block diagram of an embodiment of a video stream mixer 60 in accordance with the proposed technology. A mix zone detector 32 is configured to determine macro blocks involved in mixing and macro blocks not involved in mixing. A slice separator 34 is configured to separate the encoded primary video stream, for example stream A in FIG. 5, into at least one unmixed slice of macro blocks not involved in mixing and at least one complementary slice of macro blocks involved in mixing.

Figure 11:
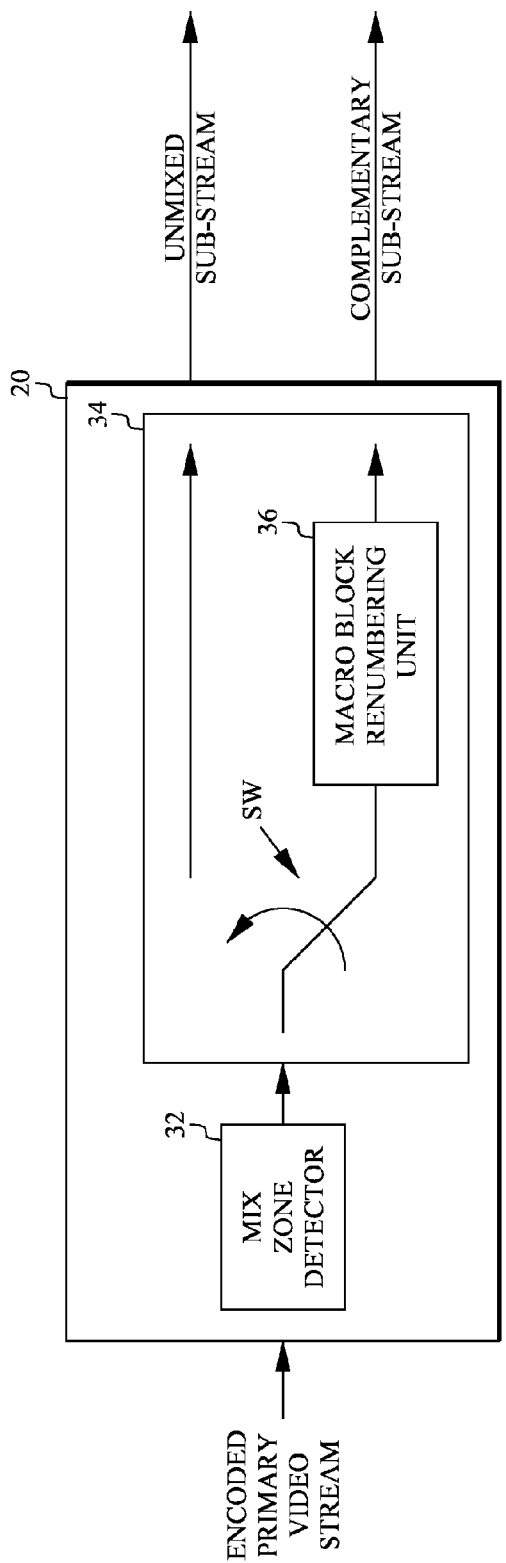
FIG. 11 is a block diagram of an embodiment of a video stream splitter.

FIG. 11 is a block diagram of an embodiment of a video stream splitter 20. In this embodiment the slice separator 34 includes a macro block renumbering unit 36 configured to renumber macro blocks of each complementary slice before decoding. A switch SW directs slices involved in mixing to the macro block renumbering unit 36, and slices not involved in mixing to the video stream combiner 28.

Figure 12:
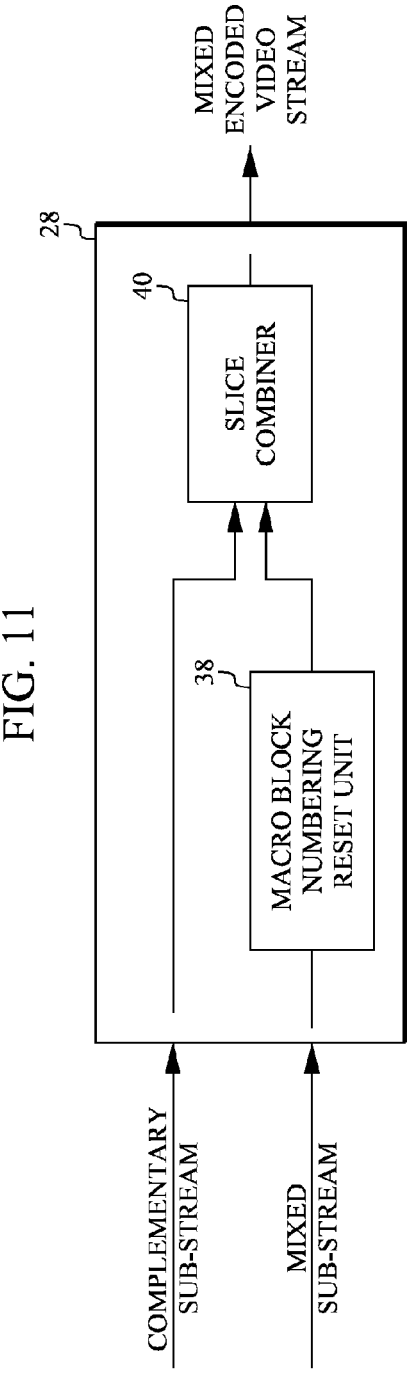
FIG. 12 is a block diagram of an embodiment of a video stream combiner.

FIG. 12 is a block diagram of an embodiment of a video stream combiner 28. A macro block numbering reset unit 38 is configured to reset the numbering of the renumbered macro blocks after mixing and encoding, and a slice combiner 40 is configured to combine unmixed and mixed slices.

The steps, functions, procedures and/or blocks described herein may be implemented in hardware using any conventional technology, such as discrete circuit or integrated circuit technology, including both general-purpose electronic circuitry and application-specific circuitry.

Alternatively, at least some of the steps, functions, procedures and/or blocks described herein may be implemented in software for execution by suitable processing equipment. This equipment may include, for example, one or several micro processors, one or several Digital Signal Processors (DSP), one or several Application Specific Integrated Circuits (ASIC), video accelerated hardware or one or several suitable programmable logic devices, such as Field Programmable Gate Arrays (FPGA). Combinations of such processing elements are also feasible.

It should also be understood that it may be possible to reuse the general processing capabilities already present in the media resource function. This may, for example, be done by reprogramming of the existing software or by adding new software components.

Figure 13:
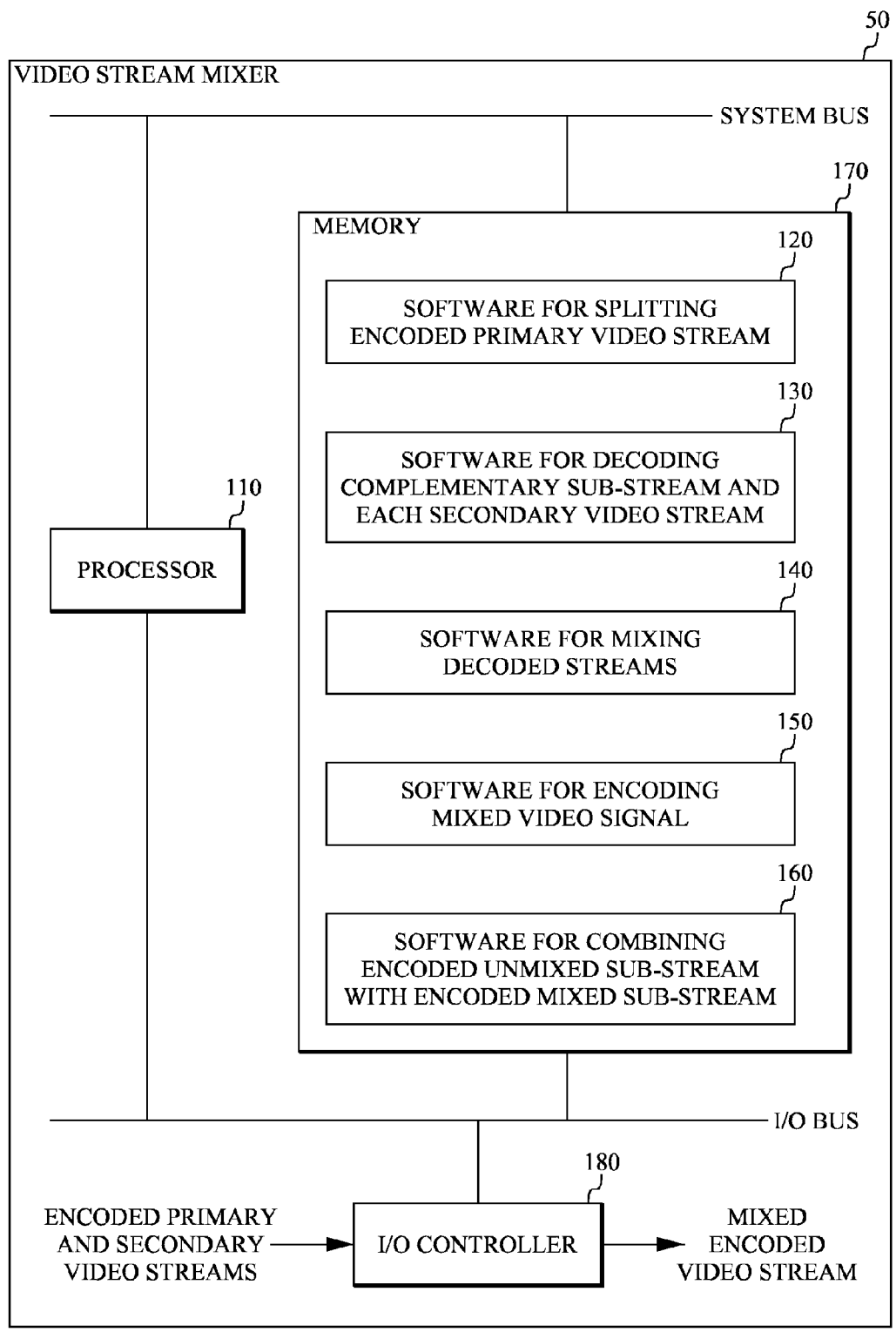
FIG. 13 is a block diagram of an embodiment of a video stream mixer in accordance with the proposed technology.

FIG. 13 is a block diagram of an embodiment of a video stream mixer 60 in accordance with the proposed technology. This embodiment is based on a processor 110, for example a micro processor, which executes software 120 for splitting an encoded primary video stream, software 130 for decoding a complementary sub-stream and each secondary video stream, software 140 for mixing the decoded streams, software 150 for encoding the mixed video signal, and software 160 for combining the encoded unmixed sub-stream with the encoded mixed sub-stream. The software is stored in memory 170. The processor 110 communicates with the memory over a system bus. The incoming primary and secondary video streams are received by an input/output (I/O) controller 180 controlling an I/O bus, to which the processor 110 and the memory 130 are connected. In this embodiment the slices received by the I/O controller 180 are stored in the memory 170, where they are processed by the software 120-160. The software 120 may implement the functionality of the video stream splitter 20. The software 130 may implement the functionality of the video stream decoder 22. The software 140 may implement the functionality of the video signal mixer 24. The software 150 may implement the functionality of the video encoder 26. The software 160 may implement the functionality of the video stream combiner 28. The combined encoded video stream obtained from the software 160 is outputted from the memory 170 by the I/O controller 180 over the I/O bus.

Figure 14:
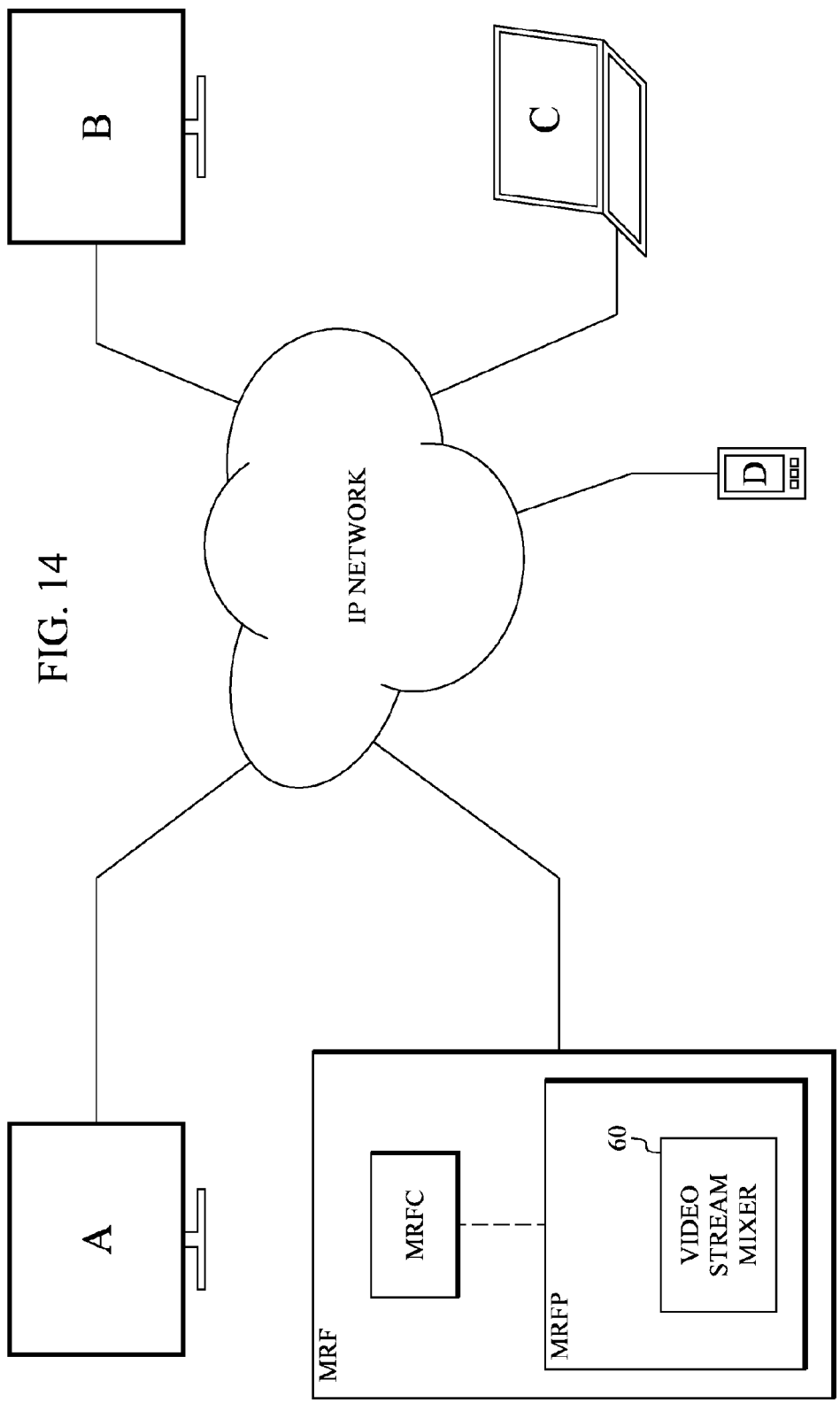
FIG. 14 is a diagram illustrating a video conferencing system based on the proposed technology.

FIG. 14 is a diagram illustrating an example of a video conferencing system based on the proposed technology. It includes a media resource function MRF with a media resource function processor MRFP including a video stream mixer 60 in accordance with the proposed technology.

The proposed technology is beneficial when the processing power and memory resources are limited, as is the case with most DSP platforms. The proposed technology presents a way to decrease the required total processing power of the system to a fraction of what it would be when using the brute force method of the prior art. This is especially the case in video conferencing in which several mixes are generated. The exact processing gain depends on the size of the part of the video frames that is not involved in the mixing and on the number of mixes that are to be generated.

The proposed technology is especially beneficial in cases where there is insufficient power to completely decode all the frames, create several mixes and encode the large mixes in the same processor. If one processor can only perform one encoding and not all processors have access to the same memory, decoding has to be performed several times in the prior art.

Another advantage of the proposed technology is that it is environmentally friendly, since less processing and memory requirements directly corresponds to less power consumption.

It will be understood by those skilled in the art that various modifications and changes may be made to the proposed technology without departure from the scope thereof, which is defined by the appended claims.

REFERENCE

[1] ITU-T H264 "Slice header semantics" section 7.4.3

ABBREVIATIONS

ASIC Application Specific Integrated Circuits
DSP Digital Signal Processor
FPGA Field Programmable Gate Array
IMS IP Multimedia Subsystem
IP Internet Protocol
MRF Media Resource Function
RTP Real-time Transport Protocol
UDP User Data gram Protocol

The invention claimed is:

1. A method of generating a mixed encoded video stream from an encoded primary video stream associated with a primary window and at least one encoded secondary video stream, each encoded secondary video stream associated with a corresponding secondary window that is smaller than the primary window, said method comprising:
   splitting the encoded primary video stream into an encoded unmixed sub-stream associated with a sub-window in the primary window and not involved in mixing, and an encoded complementary sub-stream associated with a sub-window complementary to the sub-window in the primary window and involved in mixing;
   decoding the complementary sub-stream and each encoded secondary video stream;
   mixing the decoded complementary sub-stream with each decoded secondary video stream to form a mixed video signal;
   encoding the mixed video signal into an encoded mixed sub-stream; and
   combining the encoded unmixed sub-stream with the encoded mixed sub-stream.

2. The method of claim 1, further comprising:
   determining macro blocks involved in mixing and macro blocks not involved in mixing; and
   separating the encoded primary video stream into at least one unmixed slice of macro blocks not involved in mixing and at least one complementary slice of macro blocks involved in mixing.

3. The method of claim 2, further comprising:
   renumbering macro blocks of each complementary slice before decoding; and
   resetting a numbering of the renumbered macro blocks after mixing and encoding.

4. A video stream mixer for generating a mixed encoded video stream from an encoded primary video stream associated with a primary window, and at least one encoded secondary video stream, each encoded secondary video stream associated with a corresponding secondary window that is smaller than the primary window, said mixer comprising:
   a video stream splitter configured to split the encoded primary video stream into
      an encoded unmixed sub-stream associated with a sub-window in the primary window and not involved in mixing, and
      an encoded complementary sub-stream associated with a sub-window complementary to the sub-window in the primary window and involved in mixing;
   a video stream decoder configured to decode the complementary sub-stream and each encoded secondary video stream;
   a video signal mixer configured to mix the decoded complementary sub-stream with each decoded secondary video stream to form a mixed video signal;
   a video encoder configured to encode the mixed video signal into an encoded mixed sub-stream; and
   a video stream combiner configured to combine the encoded unmixed sub-stream with the encoded mixed sub-stream.

5. The video stream mixer of claim 4, comprising:
   a mix zone detector configured to determine macro blocks involved in mixing and macro blocks not involved in mixing; and
   a slice separator configured to separate the encoded primary video stream into at least one unmixed slice of macro blocks not involved in mixing and at least one complementary slice of macro blocks involved in mixing.

6. The video stream mixer of claim 5, wherein the slice separator includes a macro block renumbering unit configured to renumber macro blocks of each complementary slice before decoding.

7. The video stream mixer of claim 6, wherein the video stream combiner includes:
   a macro block numbering reset unit configured to reset a numbering of the renumbered macro blocks after mixing and encoding; and
   a slice combiner configured to combine unmixed and mixed slices.

8. A media resource device, comprising:
   a video stream mixer configured to generate a mixed encoded video stream from an encoded primary video stream associated with a primary window, and at least one encoded secondary video stream, each encoded secondary video stream associated with a corresponding secondary window that is smaller than the primary window, the video stream mixer comprising:
      a video stream splitter configured to split the encoded primary video stream into
         an encoded unmixed sub-stream associated with a sub-window in the primary window and not involved in mixing, and an encoded complementary sub-stream associated with a sub-window complementary to the sub-window in the primary window and involved in mixing;

a video stream decoder configured to decode the complementary sub-stream and each encoded secondary video stream;

a video signal mixer configured to mix the decoded complementary sub-stream with each decoded secondary video stream to form a mixed video signal;

a video encoder configured to encode the mixed video signal into an encoded mixed sub-stream; and a video stream combiner configured to combine the encoded unmixed sub-stream with the encoded mixed sub-stream.

9. A non-transitory computer readable storage medium storing a computer program comprising program instructions which, when executed on a media resource function processor (MRFP), causes the MRFP to:

generate a mixed encoded video stream from an encoded primary video stream associated with a primary window, and at least one encoded secondary video stream, each encoded secondary video stream associated with a corresponding secondary window that is smaller than the primary window;

split the encoded primary video stream into an encoded unmixed sub-stream associated with a sub-window in the primary window and not involved in mixing, and an encoded complementary sub-stream associated with a sub-window complementary to the sub-window in the primary window and involved in mixing;

decode the complementary sub-stream and each encoded secondary video stream;

mix the decoded complementary sub-stream with each decoded secondary video stream to form a mixed video signal;

encode the mixed video signal into an encoded mixed sub-stream; and combine the encoded unmixed sub-stream with the encoded mixed sub-stream.

10. A video conferencing system comprising a media resource device, the media resource device comprising:

a video stream mixer configured to generate a mixed encoded video stream from an encoded primary video stream associated with a primary window, and at least one encoded secondary video stream, each encoded secondary video stream associated with a corresponding secondary window that is smaller than the primary window, the video stream mixer comprising:

a video stream splitter configured to split the encoded primary video stream into an encoded unmixed sub-stream associated with a sub-window in the primary window and not involved in mixing, and an encoded complementary sub-stream associated with a sub-window complementary to the sub-window in the primary window and involved in mixing;

a video stream decoder configured to decode the complementary sub-stream and each encoded secondary video stream;

a video signal mixer configured to mix the decoded complementary sub-stream with each decoded secondary video stream to form a mixed video signal;

a video encoder configured to encode the mixed video signal into an encoded mixed sub-stream; and a video stream combiner configured to combine the encoded unmixed sub-stream with the encoded mixed sub-stream.

11. A video conferencing system comprising a video stream mixer configured to generate a mixed encoded video stream from an encoded primary video stream associated with a primary window, and at least one encoded secondary video stream, each encoded secondary video stream associated with a corresponding secondary window that is smaller than the primary window, the video stream mixer comprising:

a video stream splitter configured to split the encoded primary video stream into an encoded unmixed sub-stream associated with a sub-window in the primary window and not involved in mixing, and an encoded complementary sub-stream associated with a sub-window complementary to the sub-window in the primary window and involved in mixing;

a video stream decoder configured to decode the complementary sub-stream and each encoded secondary video stream;

a video signal mixer configured to mix the decoded complementary sub-stream with each decoded secondary video stream to form a mixed video signal;

a video encoder configured to encode the mixed video signal into an encoded mixed sub-stream; and a video stream combiner configured to combine the encoded unmixed sub-stream with the encoded mixed sub-stream.

* * * * *